(12) United States Patent
Petring et al.

(10) Patent No.: US 9,035,217 B2
(45) Date of Patent: May 19, 2015

(54) METHOD FOR MACHINING MATERIAL USING LASER RADIATION AND APPARATUS FOR CARRYING OUT THE METHOD

(75) Inventors: Dirk Petring, He Kerkrade (NL); Frank Schneider, Aachen (DE); Wolfgang Schulz, Langerwehe (DE); Markus Niessen, Niederzier (DE)

(73) Assignee: FRAUNHOFER-GESELLSCHAFT ZUR FOERDERUNG DER ANGEWANDTEN FORSCHUNG E.V., Munich (DE)

(*) Notice: Subject to any disclaimer, the term of this patent is extended or adjusted under 35 U.S.C. 154(b) by 1044 days.

(21) Appl. No.: 12/601,927

(22) PCT Filed: May 23, 2008

(86) PCT No.: PCT/EP2008/004127
§ 371 (c)(1),
(2), (4) Date: Jan. 25, 2010

(87) PCT Pub. No.: WO2008/145305
PCT Pub. Date: Dec. 4, 2008

(65) Prior Publication Data
US 2010/0176102 A1 Jul. 15, 2010

(30) Foreign Application Priority Data
May 25, 2007 (DE) .......................... 10 2007 024 700

(51) Int. Cl.
*B23K 26/00* (2014.01)
*B23K 26/38* (2014.01)
*B23K 26/06* (2014.01)

(52) U.S. Cl.
CPC ........... *B23K 26/381* (2013.01); *B23K 26/0604* (2013.01); *B23K 26/0617* (2013.01); *B23K 26/383* (2013.01); *B23K 26/385* (2013.01)

(58) Field of Classification Search
USPC .......................... 219/121.72, 121.67
See application file for complete search history.

(56) References Cited

U.S. PATENT DOCUMENTS

| 4,275,288 A * | 6/1981 | Makosch et al. ......... 219/121.75 |
| 6,175,096 B1 * | 1/2001 | Nielsen .................... 219/121.72 |

(Continued)

FOREIGN PATENT DOCUMENTS

| DE | 101 40 533 A1 | 8/2001 |
| DE | 103 29 075 A1 | 6/2003 |

OTHER PUBLICATIONS

Petring, D.: Application-oriented modeling of laser beam cutting for computer-aided process optimization. Verlag Shaker, Aachen 1995, p. 22-29.

(Continued)

*Primary Examiner* — Jamie C Niesz
(74) *Attorney, Agent, or Firm* — Karl F. Milde, Jr.; Eckert Seamans Cherin & Mellott, LLC (57) ABSTRACT

In a method and device for machining material, an unfocused beam of laser radiation is focused and directed at the material surface, creating an interface of laser radiation and material to be machined. The beam waist, which results from the focusing the laser radiation, is held in the region of the interface of laser radiation and material. The spacing of the beam waist from the upper or lower side of the interface in the axial direction corresponds at most to triple the value of the penetration depth of the interface into the material. The focusing is effected such that components of the laser radiation are made divergent not just in the propagation direction downstream of the beam waist but also in the beam waist itself and/or also in the propagation direction upstream of the beam waist.

16 Claims, 6 Drawing Sheets

(56) References Cited

U.S. PATENT DOCUMENTS

| | | |
|---|---|---|
| 2003/0090562 A1* | 5/2003 | Kubota et al. ............... 347/241 |
| 2004/0047268 A1* | 3/2004 | Yanagisawa et al. .... 369/112.02 |
| 2005/0024743 A1 | 2/2005 | Camy-Peyret |
| 2005/0067393 A1* | 3/2005 | Olivier ..................... 219/121.75 |
| 2006/0261050 A1* | 11/2006 | Krishnan et al. ......... 219/121.74 |

OTHER PUBLICATIONS

Petring, D.: Application-oriented modeling of laser beam cutting for computer-aided process optimization]. Verlag Shaker, Aachen 1995, p. 110-112.

* cited by examiner

FIG. 1

Detail "A"

METHOD FOR MACHINING MATERIAL USING LASER RADIATION AND APPARATUS FOR CARRYING OUT THE METHOD

BACKGROUND OF THE INVENTION

The invention relates to a method for machining material using laser radiation, in which the unfocused laser radiation, which is typically collimated, is focused through a focusing optics to a smaller beam cross-section, the optical axis of the focused laser radiation, referred to as beam axis, is directed at the material surface, whereby the beam axis is stationary relative to the material or is being moved along a processing path, which results from the focusing operation of the focused laser radiation and is held in the region of the interface of laser radiation and material, the laser radiation is partially absorbed on the interface such that due to induced material removal or induced material displacement the interface and thus also the laser radiation penetrate into the material, wherein the spacing of the beam waist from the upper or lower side of the interface in the axial direction corresponds to at most triple the value of the penetration depth of the interface into the material. The laser radiation used for machining the material can consist of one or more beams that are generated using one or more radiation sources.

The invention furthermore relates to a respective device for machining material using laser radiation. Methods for machining material using laser radiation, where the focused laser radiation penetrates the material are, for example, drilling, removing, cutting and welding. While the penetration of the interface and thus also of the laser radiation into the material in the first three methods mentioned occurs by material removal in the form of melting, evaporating, sublimating or disintegrating, in the case of laser welding a vapor capillary is generated in a molten bath of the material that displaces the molten bath and through which the laser can penetrate into the material. In drilling, the material may remain stationary relative to the laser beam; the other methods utilize a relative movement of the laser radiation relative to the material. All methods mentioned can be aided by using a process gas flow that can consist of reactive but also of inert gases and said gas flow is used, for example, for expelling the molten or evaporated material components or for influencing the surface properties of the interface and of adjacent material regions.

All named methods have in common that the interface typically has a grid ratio above 1, i.e., the beam diameter and the width of the interface are smaller than the penetration depth into the material. Thus, significant importance is not only placed on the radiation properties on an, at best, minimally deformed material surface, as is the case with surface-treating laser methods, but rather on the radiation properties of the entire propagating interface, which penetrates the material, across the entire propagation distance of the radiation between the upper side of the interface and the lower side of the interface.

Until now—in addition to the radiation power—the beam diameter in the beam waist, often referred to as the focal diameter, and the Rayleigh length of the radiation in the waist region, defined as the distance along the beam axis measured from the beam waist to the point, where the beam cross-sectional area has doubled, have been considered significant radiation properties. In addition, the influence of the power density distribution in the beam cross-section (also referred to as intensity distribution) in particular in the beam waist on the machining result is considered important, although the exact effects of the intensity distribution are still not known sufficiently. Until now, the distribution of the directions of propagation of various radiation components in the focused laser radiation and their influence on the efficiency of the machining process and on the machining result have not been taken into account at all.

It is known that high-performance $CO_2$ lasers (10µ emitters) with a wavelength of approx. 10 µm and with a laser power of 1-15 kW are used industrially for laser material machining applications (for example, macro applications for sheet metal in a range from 1 mm to 30 mm). In addition, rod lasers, fiber lasers and disc lasers (1µ emitters) with wavelengths of approx. 1 µm and with a laser power of 1-8 kW are used. In particular, these radiation sources offer economic advantages and are, therefore, being increasingly used. However, it has become apparent that in particular when cutting with laser radiation, the achievable machining quality is dependent, for example, on the radiation source used (fiber lasers, disc lasers (1µ emitters), gas lasers 10µ emitters) and, for example, on the thickness of the sheet to be cut and the travel speed.

Current developments in material machining using lasers aim at a further increase in the machining speed, an increase in the achievable machining depths and/or of the machined material thicknesses, an improvement of the process robustness, an avoidance of process instability and not least an increase in the achievable machining quality. For this reason, increasingly greater laser powers and systems with a high-quality drive technology are introduced in manufacturing. The development aims at expanding the technical restrictions of process control.

Quality of the Machining Geometry Using the Example of Cutting:

In addition to low roughness and burr-free bottom sides as well as products free of oxides, evenness and right angles are significant quality requirements for the cut edge. The following points should, therefore, be considered:

With an increasing sheet metal thickness, the cut edge exhibits increasingly rough gouges, which appear in particular in the lower part of the cut edge (e.g., abrasion kerf) and occur increasingly when the cutting gas pressure is too small, the kerf is too narrow or the speed is too high.

In particular with low or high feed rates, the melt is not fully removed from the bottom edge. The attached and then solidifying melt forms the undesired burr. The mechanisms by which such burrs are generated are understood only in part. They are, among other things, connected to the formation of gouges.

From experiential observations, it became known that the undesired and today unavoidable gouges can change at a region of a certain removal depth (or cutting depth) from small peak-to-valley roughness depths to significantly greater values. This change can occur in a region of the cutting depth that is small compared to the thickness of the workpiece. During a cut, this region may occur at varying depths on the cut edge (or removal edge, respectively).

Absorption of the Laser Radiation:

SUMMARY OF THE INVENTION

It is known that the absorption of the laser radiation at the interface, which has a decisive influence on the process efficiency, can be calculated using the so-called Fresnel formalism (Petring, D.: Anwendungsorientierte Modellierung des Laserstrahlschneidens zur rechnergestützten Prozessoptimierung. [*Application-oriented modeling of laser beam cutting for computer-aided process optimization*]. Verlag Shaker, Aachen 1995, P. 22-29). The degree of absorption, that is, the ratio of the absorbed power density of the laser radiation to that striking the interface is, accordingly, in particular, dependent on the incident angle between the laser radiation and the surface normal at the striking point of the interface. The degree of absorption is additionally dependent on the polarization state of the laser radiation. These explanations are based on the assumption of a circular or statistic polarization. It shall, however, be noted that the statements of this document can also be transferred to linear or radial polarizations. In addition to the incident angle and the polarization, the degree of absorption is also dependent on the refractive index of the material, which in turn is dependent on the material temperature and the wavelength of the laser.

Figure 6:
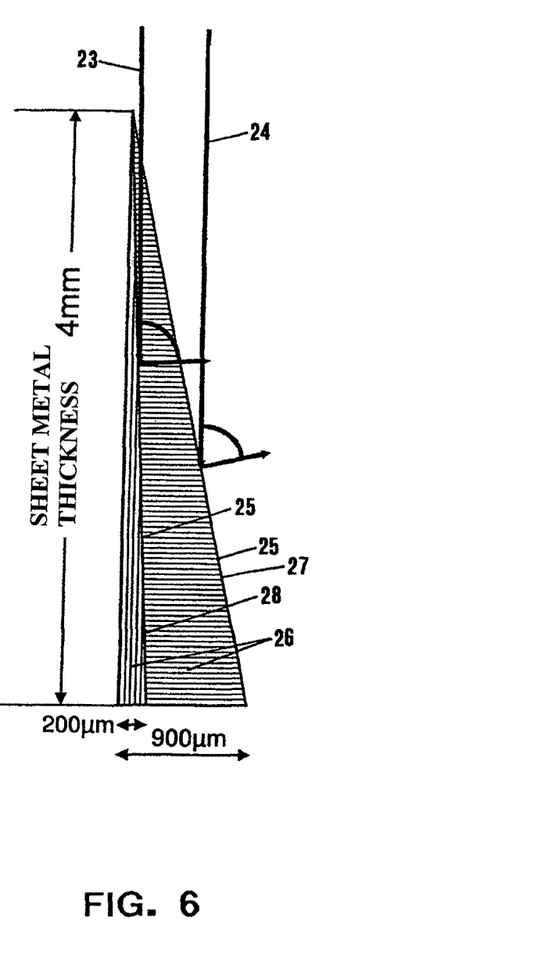
FIG. 6 shows an example for the adjustment of the incident angle near the main absorption maximum with an incident angle of 78° for 1 μm laser radiation and an incident angle of 87° for 10 μm laser radiation, each without beam divergence.

FIG. 6 of the enclosed drawing shows the dependence of the degree of absorption on the angle for steel materials and the typical laser wavelengths of 1 µm and 10 µm. Each shows a characteristic main absorption maximum. To adjust the incident angle at least to the proximity of the maximum value, the proportional adaptation of the waist diameter to the sheet metal thickness has already been recommended (Petring, D.: Anwendungsorientierte Modellierung des Laserstrahlschneidens zur rechnergestützten Prozessoptimierung. [*Application-oriented modeling of laser beam cutting for computer-aided process optimization*]. Verlag Shaker, Aachen 1995, P. 110-112). This approach aims primarily at high process efficiency and has already been successfully proven. However, in the case of a laser wavelength of 1 µm and a sheet metal thickness of 4 mm, it would require beam waist diameters of up to 0.9 mm (ref. FIG. 6), which in turn would lead to the previously mentioned disadvantages of large beam diameters.

It is the objective of the present invention to provide a method for machining material with which the laser radiation is partially absorbed on the interface such that, due to induced material removal or induced material displacement, the interface and thus also the laser radiation penetrate into the material, with which the process efficiency and the process stability and in particular the resultant machining quality can be improved beyond the limits of the current state-of-the-art. Using the example of laser cutting, it is known from prior art that improper settings of the cutting parameters can cause an unnecessary strong increase in the gouge amplitude with an increase in the removal depth. Examples are a gas pressure that is too low, a removal kerf that is too narrow (e.g., with fine cutting) or a feed rate that is too high. The central task is, therefore, to avoid the formation of gouges with unnecessary large amplitudes that cannot be reduced even after appropriate use of known measures. This objective is achievable based on a surprising observation of the prior art: When using selected radiation sources for laser cutting, such as the 1µ emitter (fiber laser, disc laser, etc.), for example, or when cutting large workpieces, large gouge amplitudes occur that cannot be avoided using known means. Also, the known state of research does not offer explanatory information regarding the cause or the mechanisms that result in the undesired large gouge amplitudes. It is also not known how the absorption can be increased while at the same time avoiding interfaces that are too wide.

These objectives are achieved with a method of the aforementioned kind wherein focusing is carried out in such a manner that components of the laser radiation are not only directed in the direction of propagation downstream of the beam waist but also in the beam waist and/or in the direction of propagation upstream of the beam waist and thus away from the beam axis, and wherein these components and divergent angles are greater than those of the effects of image defects that occur inadvertently with standard optics and are accepted.

With regard to a device, the objective is achieved with a device for machining material with at least one laser source and one focusing optics that focuses the laser radiation of the laser radiation source, whereby the optical axis of the focused laser radiation, referred to as the beam axis, is directed to one machining plane, whereby the beam waist, which results from the focusing operation, of the focused laser radiation is held in the region of the interface, which forms of the laser radiation and material, and with devices for holding the beam waist focused laser radiation resulting from the radiation in the region of the forming interface of laser radiation and material, which is characterized in that the focusing optics and a beam-forming optics are designed such that components of the laser radiation are not only directed in the direction of propagation downstream of the beam waist but also in the beam waist and/or in the direction of propagation upstream of the beam waist and thus away from the beam axis, and in that these components and divergent angles are greater than those of the effects of image defects that occur with standard optics and are accepted.

Image defects of standard optics as stated here refer to image defects that are occurring unintentionally, i.e., unwanted with typically used standard optics and are accepted with such standard optics.

Using the method according to the invention, the base absorption of the laser radiation, that is, the absorption without taking into account the absorption components from multiple reflections, can be increased, even with interfaces having a large depth to width grid ratio (cutting edges, drilling channels, welding capillaries), i.e., on steep interfaces, because the smaller incident angles required for it, are made possible by the greater divergent angles. The Fresnel absorption reaches its maximum only at comparatively small incident angles (e.g., at a 1 µm wavelength and steel: <80°) and is therefore favored by flatter interfaces.

With the smaller incident angles, the changes in absorption as a result in of changes of shape and/or position of the interface are reduced as well, and thus also for changes in the incident angle, such that a generation or an increase of instabilities in the machining process is avoided. Reflections of even only slightly instable points of impact in the upper area of the interface lead to increased instabilities in the subsequent points of impact of the reflected radiation components. This problem is solved by reducing the reflection through higher absorption and smaller incident angles as well as by the lower angle dependence of the absorption at smaller incident angles. In this manner, an increase of instable processes during machining is avoided or suppressed in two ways.

Advantageous is also the reduction of the component of the multiple reflections through an increased direct absorption in the first point of impact of the respective partial beams, which can avoid increased instabilities. Finally, conical or rounded machining cross-sections, e.g., for kerfs and bore holes, can be avoided because the radiation components with a larger divergent angle affect a comparatively steep transition from the material surface to the interface, already from the upper side of the interface in the edge area of the laser radiation, even with power densities in the edge area that are lower than those in the center of the beam.

The problematic situation underlying the invention is not treated by the prior art. The same applies to the solution according to the invention.

The following conclusion was determined:

With machining methods, where the laser radiation penetrates the material to be machined through melting, evaporating, sublimating or disintegrating the material, that is, for example, drilling, removing, cutting or welding, the laser radiation typically strikes at a large angle between the normal vector of the interface and the local direction of propagation of the radiation (grazing incidence). Because the absorption of the laser radiation is, among other things, to a large degree dependent on this angle, the absorption can be increased dependent on the material and the wavelength through adjusting this angle, and an angle range can be set that has a stabilizing effect on the machining sequence for the unavoidable fluctuations of the geometric circumstances during machining. In particular when machining steel materials with laser radiation in the visible and near infrared wavelength range, a reduction in the angle has an absorption-enhancing and stabilizing effect. Both effects increase the performance capability of the method, which can be measured, e.g., by the machining speed and/or the machining quality.

With the machining methods relevant to the invention, typically geometric circumstances are present, where the cross-section of the laser beam at the location of the interaction with the material is significantly smaller than the machining depth in the direction of the beam propagation (large grid ratio). With the recommended method it is possible, in particular with machining methods with a relative movement between the beam axis and the workpiece, to adjust the desired smaller angle even at a large grid ratio by a region that is enlarged in the direction of propagation with divergent radiation components that includes divergent components even upstream of and/or in the beam waist.

To increase the performance of the machining methods, according to the prior art, the optical system consisting of a collimated laser beam and focusing optics is typically dimensioned such that a focus that is as small as possible in connection with a Rayleigh length that is suited for the material thickness to be machined is available. Optics that are used are, therefore, typically corrected such that image errors are minimized. The use of laser radiation with a high beam quality simplifies the creation of a small focus with a large Rayleigh length. However, this procedure leads to the fact that with the resultant slim caustics, a small radiation component strikes the interface divergently. With the procedure recommended by the invention, however, divergent beam components will strike the interface. Contrary to the prior art, not an improvement but a worsening of the image quality is recommended and through the special manner of worsening of the image quality, an advantageous process behavior is achieved, for example, with regard to speed and/or machining quality.

The solution, according to the invention, creates and intentionally utilizes divergent beam components in the beam waist and utilizes, in spite of a narrow interface (front, bore hole, capillary) smaller incident angles, a basic absorption that thus is greater for the specific application and has fewer multiple reflections as well as steeper interfaces, and that without rounding and chamfering the machining flanks. As an additional effect, a redistribution of the power density in the beam cross-section can, for example, be adjusted and utilized in the form of steeper flanks of a ring-shaped power density distribution.

At least one beam-shaping optic is used to create the divergent beam components upstream of and/or in the beam waist. The beam-shaping optics can be arranged upstream or downstream of the focusing optics or the beam-shaping optics can, at the same time, be used for collimating and/or focusing the laser radiation.

In one embodiment, the greater divergent angles of the beam components are used for the reduction of their incident angles on the interface and thus for an increase in the absorption of the radiation components on the interface and for a reduction of the changes of the absorption at fluctuations in the incident angles, which results in achieving the effects already described above.

In order to achieve smaller incident angles on the interface, additional divergent beam components are generated laser-internal or laser-external with at least one beam-shaping optic. Such divergent beam components can also be generated in that the amount of an aberration in the beam-shaping optics is generated or increased.

Positive or negative spherical aberrations or chromatic aberrations can be generated or their amount increased for reducing the incident angle. Negative aberrations that can be created with heavily over-corrected optics are advantageous. In case of negative aberrations, the central beam components are already divergent upstream of the beam waist, and in total generates more beam components in the region and smaller incident angles on the interface that penetrates the material below the beam waist. This applies in particular to methods for cutting and removing, because with such methods in the feed direction behind the beam axis, that is on the side facing away from the crest and/or the front of the interface more radiation components can propagate a longer distance undisturbed into the material, before they strike the interface for the first time. For the case of monochromatic radiation that is common in laser material machining, spherical aberration is used. With radiation sources where the radiation is generated by overlaying several individual beam sources with different wavelengths (e.g., some designs of diode lasers) or for lasers with a broadband emission, the chromatic aberration can be used alone or in combination with the spherical aberration.

Diffractive, refractive and/or diffuse optical elements can be employed to generate the aberration in the optics. Of these optics, refractive optical elements shall be preferred if the optical elements are struck with higher laser beam intensities (>magnitude 1 kw/cm$^2$). The optical elements used can be of solid, liquid and/or gaseous materials or of media with transmitting and/or reflecting properties, for example, in the form of lenses, mirrors, fibers and waveguides. Of the aforementioned materials, solid materials should be emphasized, because lenses and mirrors comprise by far the most common embodiments used in laser material machining. Liquid and gaseous media offer no options of beam shaping through the ability for more flexible and dynamic settings of the optical properties; this applies in particular in instances, when the beam-shaping optics is designed as an adaptive optics such that the amount and/or the lateral; and/or the axial distribution of the aberration is/are adjustable.

An aberration in the optics can also be achieved by using a combination of at least one concave and one convex optical interface, which is advantageous if, for example, through the combination of a concave and convex lens, a positive spherical aberration created by a standard focusing optics is not usually corrected to a minimal aberration but overcorrected to negative spherical aberrations. Also when using already corrected focusing optics, the combination with a concave and convex lens advantageously increases the amount of the aberration. With the optics that achieves an aberration, preferably collimating and/or focusing of the laser radiation is carried out at the same time such that the optical system can, if necessary, be realized with fewer optical elements, has a smaller build and is less sensitive to adjustments. An aberration in the optics can be achieved in that at least one optical element with an aspherical area is used; such an optical element can be designed as axicon or as Fresnel optics. An axicon or a Fresnel optics shall be preferred when a clear redistribution is to be carried out, for example, in order to suppress portions of the radiation near the axis with small divergent angles.

If an optic with few optical elements or with conventionally difficult to produce imaging properties is to be used, that is, for example, for a flexible adjustment of the distribution of the divergent angles (Poynting vectors) and a simultaneous adjustment of the intensity distribution in the axial and lateral direction, an aberration in the optics should be created by providing at least one optical element with a laterally and/or axially varying refractive index.

The beam-shaping optic can designed as an adaptive optics by moving and/or deforming the optical elements such that the amount and/or the lateral and/or axial distribution of the aberration can be adjusted. Such adjustments can be controlled for adaptation to the processing parameters such as type of material, material thickness, machining speed and/or laser power, before and/or during machining.

The adjustment of the divergent angles, e.g., by spherical aberration can additionally be utilized to achieve with the beam-shaping optic the generation of defined spatial power density distributions, e.g., as ring or top-hat distribution in the area of the interface. This is carried out advantageously, especially if due to the geometry of the interface not only the divergence of the radiation components that strike the interface locally must be adjusted but also the local power density. For example, when cutting the power density in the upper component of the interface shall be adjusted such that for the absorption that is present with the set divergent angle, a rounding of the trimmed edge is avoided.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
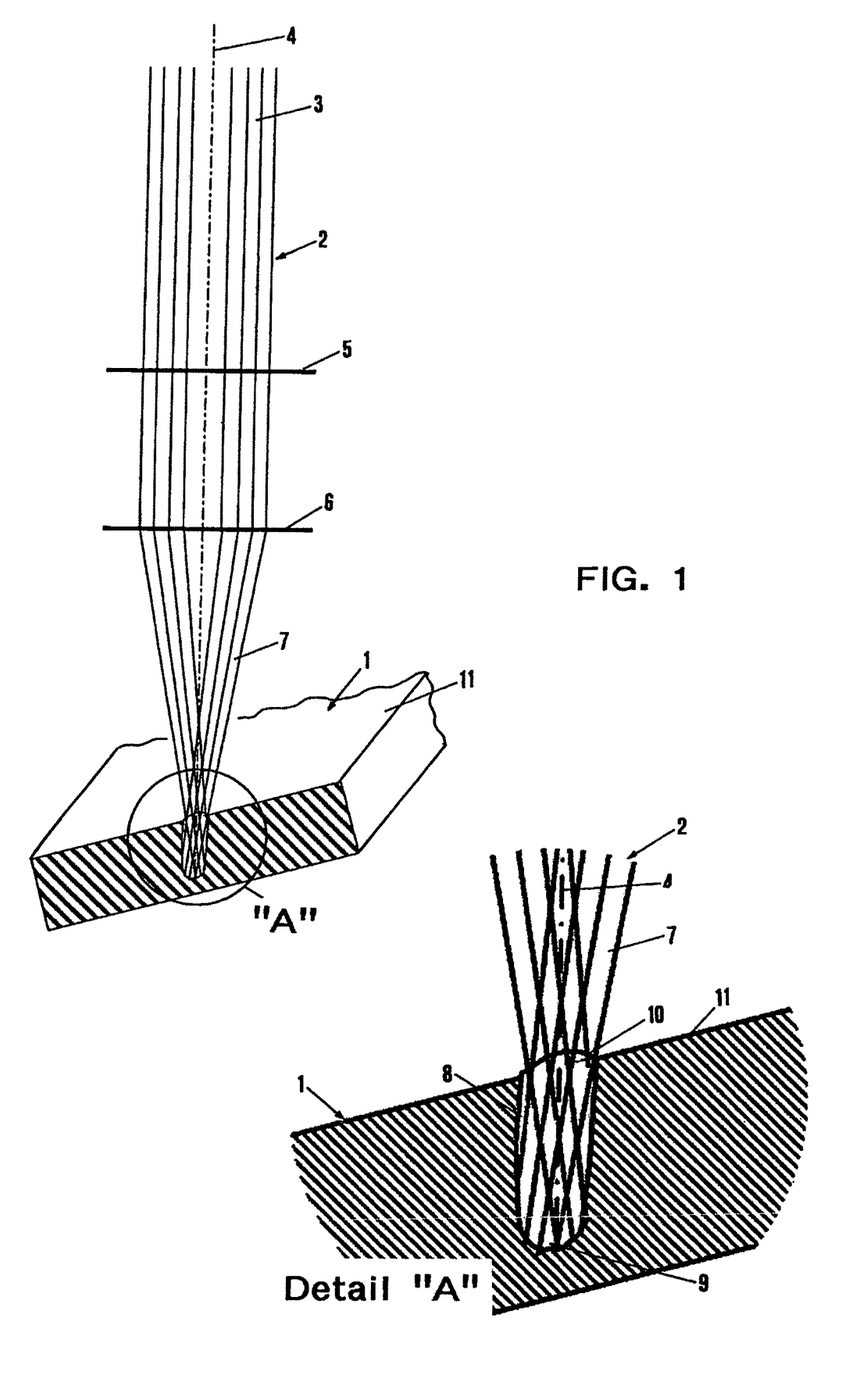
FIG. 1 shows schematically a material piece in sectional view, as well as the extent of the laser radiation, whereby the region of the interface of laser radiation and material is presented in a magnified view designated as detail "A".

FIG. 1 shows a workpiece or a material 1, respectively, that is being machined using laser radiation 2. The unfocused laser radiation 3, with its optical axis (beam axis) designated with the number 4, is initially guided through a beam-shaping optic 5 and then through a focusing optic 6. The focused radiation 7 then strikes the workpiece or material 1, respectively. As shown in a magnified presentation in detail "A", an interface designated with the reference character 8, is formed between the laser radiation 2 and the material, with the lower side 9 of this interface here located in the workpiece, or material, respectively but could, of course, also be located at a bottom side of a workpiece or material, respectively, while the upper side 10 of this interface is located at the material surface 11.

Figure 2:
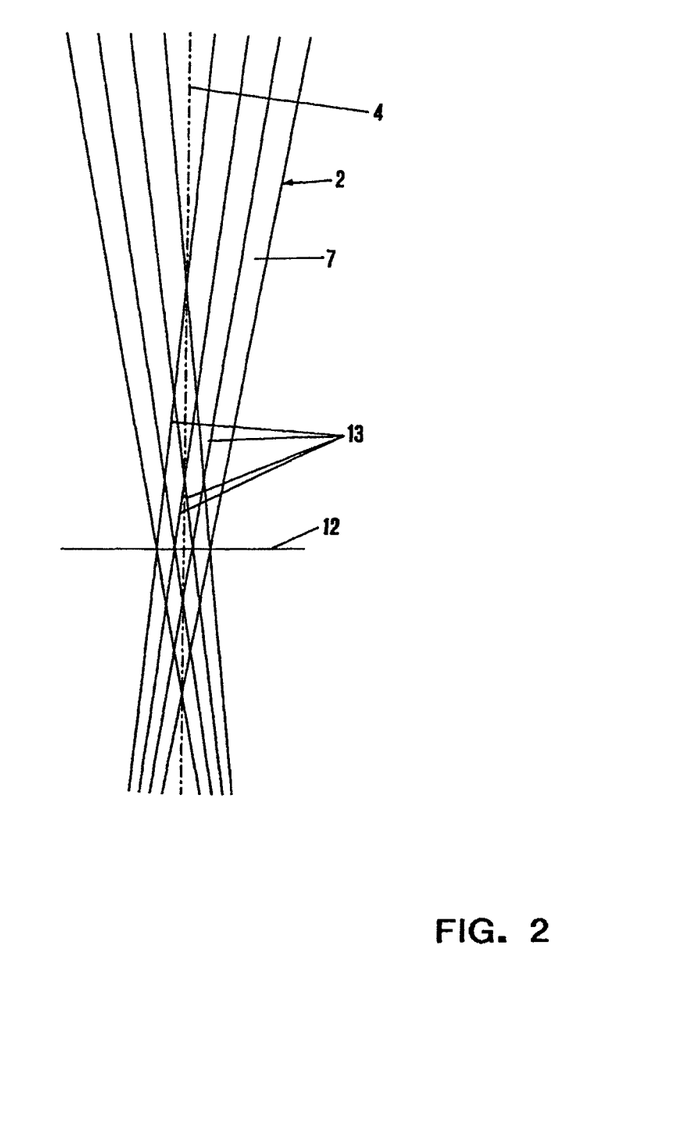
FIG. 2 shows a magnified presentation of the radiation path in the region of the beam waist in order to show the divergent radiation components.

As FIG. 1 shows and as can be seen even better in FIG. 2, the beam-shaping is carried out with the beam-shaping optic 5 such that the focusing optics 6 focuses the laser radiation such that it is made divergent both in the direction of propagation downstream of the beam waist, which in FIG. 2 is designated with the reference character 12 and in the beam waist 12 itself and in particular upstream of the beam waist, such that the laser radiation 2 is directed away from the beam axis 4. In FIG. 2, the direction of propagation of the divergent beam components upstream of the beam waist is designated with the reference character 13. The beam components and their divergent angles are designed such that they are greater than those radiation components and divergent angles that arise from the imaging errors of the focusing optic 6 and are not intended, i.e., that can be ascribed to the employed standard optical components.

The greater divergent angles of the radiation component are utilized for reducing their incident angles onto the interface 10 such that in doing so an increased absorption of the radiation components of the radiation 2 in the region of the interface 8 is utilized. The greater divergent angles are also used for reducing the changes in the absorption at incident angle fluctuations because with small incident angles the changes in the absorption with changing incident angles become smaller, which will be explained in greater detail below based on FIGS. 5 to 7.

Figure 3:
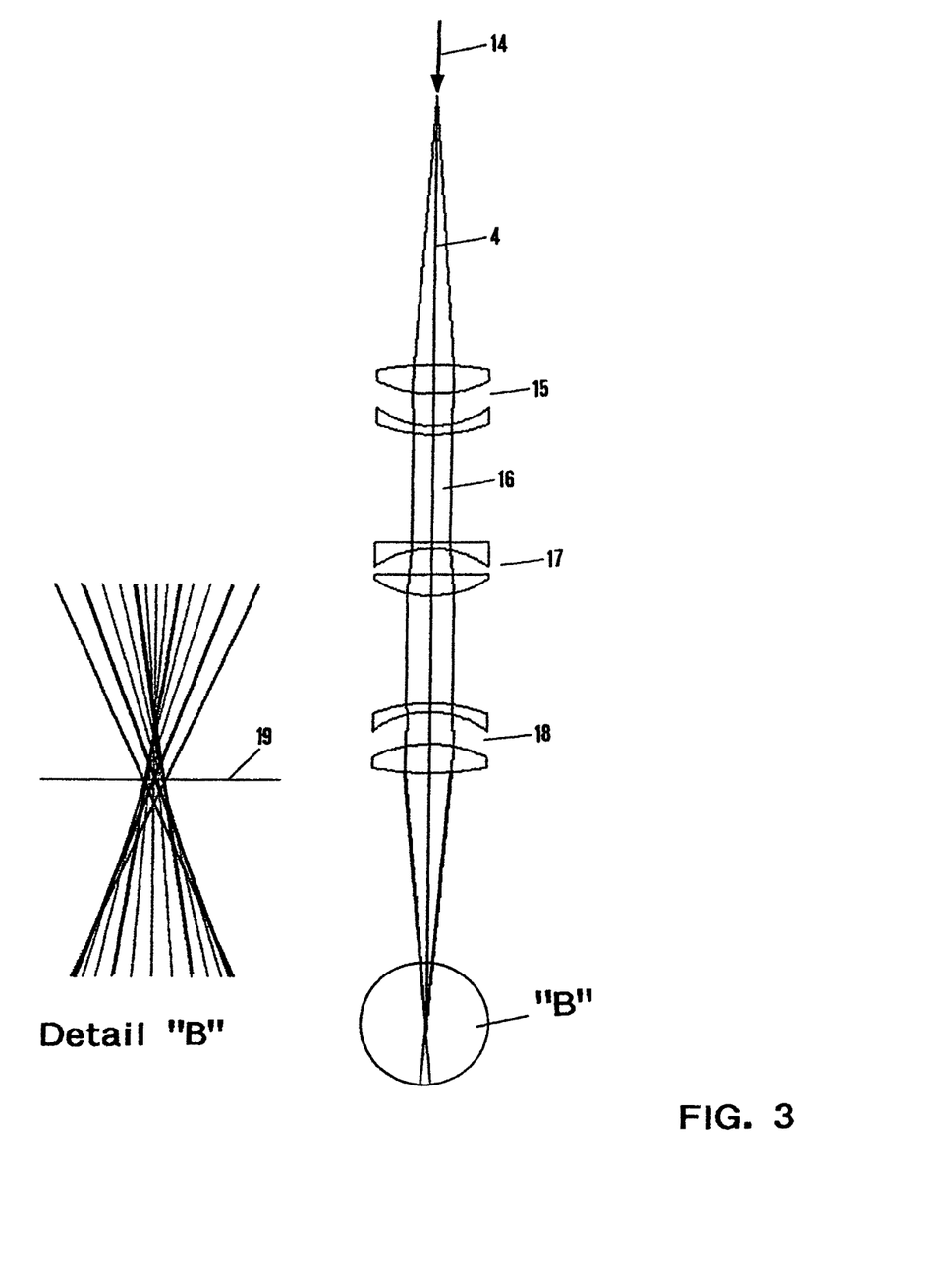
FIG. 3 shows schematically a region of a device according to the invention with the essential optical components with detail "B" being presented magnified.

FIG. 3 shows schematically the overall structure of the device in order to carry out the described method according to the invention.

The device comprises as a radiation source, optionally a laser with a fiber-guided laser radiation, in general designated with the arrow 14. The radiation emitted by the laser or the fiber optic, respectively, with the beam axis being designated with the reference character 4 as in FIGS. 1 and 2, is collimated via a collimation optic 15 and the collimated laser beam 16 is provided to an aberration optic 17, which in the shown embodiment is comprised of concave-convex optics. The radiation emitted by the aberration optic 17 is then focused via a focusing optic 18 onto a workpiece or material (not shown here) with the focusing region being shown magnified in detail "B". Looking at this detail "B", the beam waist with an aberred beam can be recognized around an indicated plane 19, comparable to the presentation of FIG. 2.

These collimations and focusing optics 15, 18 can be designed as one or multi-lens systems. The aberration optic 17 can also be designed from other combinations of concave and convex surfaces and transmissive optics could not only be replaced by reflective and/or diffractive optics but also by diffuse optics. It is also possible to combine the focusing optic 18 and/or collimation optic 15 and the aberration optic 17 in one or two optical systems.

Figure 4:
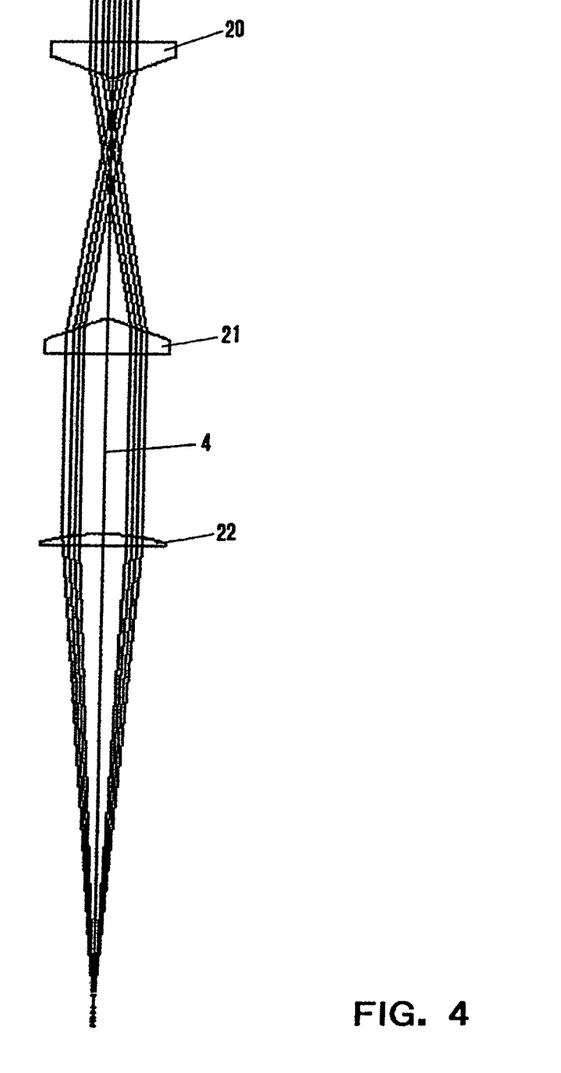
FIG. 4 shows a structure of the device that is different from that in FIG. 3 and uses axicons.

FIG. 4 shows an embodiment where the aberration optic 17 of FIG. 3 is made up of two axicons 20, 21. These axicons 20, 21 have equal angles of the outer surfaces that are oriented pointing towards each other. The focusing optic 22 of FIG. 4 is presented schematically by a single lens.

The axicons 20, 21 of the aberration optic of FIG. 4 can have equal or unequal angles of the outer surfaces or can have a reverse orientation with regard to the direction of propagation of the laser radiation. It is also possible to use one axicon or more than two axicons. Furthermore, axicons can be used that exhibit curved surfaces or also such axicons that are designed as reflective optics.

Figure 5:
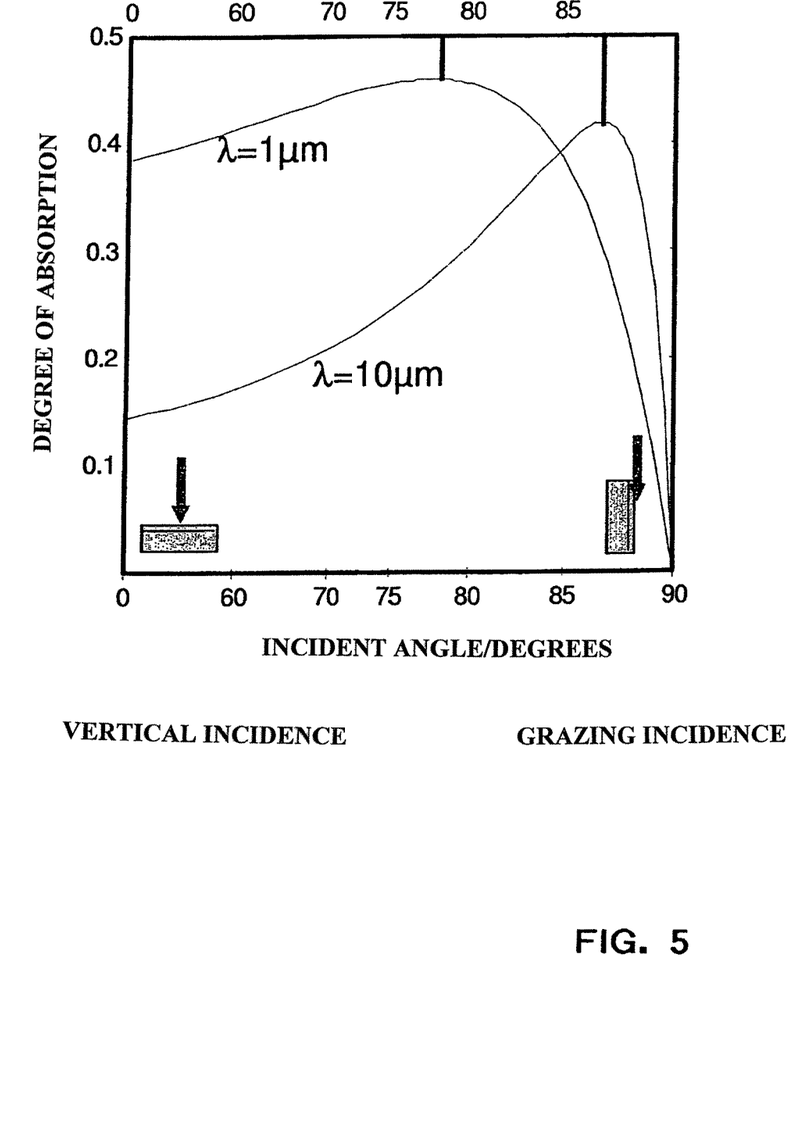
FIG. 5 shows a diagram to show the degree of absorption for radiations with the wavelengths λ of 1 μm and 10 μm as a function of the incident angle, calculated for steel materials.

The graphical presentation of FIG. 5 shall show the degree of absorption of laser radiation with the wavelengths 1 µm and 10 µm as a function of the incident angle, with the incident angles being calculated using the example of steel materials. Here, the incident angles have been plotted from 0°, i.e., vertical incidence, to 90°, i.e., grazing incidence. Looking at this graphic, it becomes apparent that the absorption at a large incident angle to the right of the main absorption maximum becomes particularly small and that the change in the absorption is especially large in this area when the incident angle changes. This effect can lead to low efficiencies and to an unstable process behavior. Shown in FIGS. 6 and 7 are now options for adjusting the incident angles near the main absorption maximum.

FIG. 6 shows two different laser radiations 23, 24 that strike the interface 25 of a workpiece or a material 26, respectively, which in the shown example is a metal sheet with a thickness of 4 mm. The presentation should be understood as a largely simplified schematic sketch only. For example, the contour of the interface is generally non-linear and many partial beams with differing Poynting vectors, i.e., different power densities and beam directions and/or divergent angles that lead to different incident angles strike the interface. The laser radiation 23, with only one beam or beam axis, respectively, being shown is a 10 µm-laser radiation without beam divergence that shall strike the interface 25 at an incident angle of 87°. This requires a steep narrow interface of 200 µm that is designated by the reference character 27 in order to achieve the main absorption maximum according to FIG. 5. The laser radiation 24 is a 1µ-laser radiation without beam divergence that shall strike the interface 25 at an incident angle of 78°. This requires a flatter, wider interface compared to the 10 µm laser radiation of 900 µm that is designated by the reference character 28 in order to achieve small incident angle of the main absorption maximum according to FIG. 5.

Figure 7:
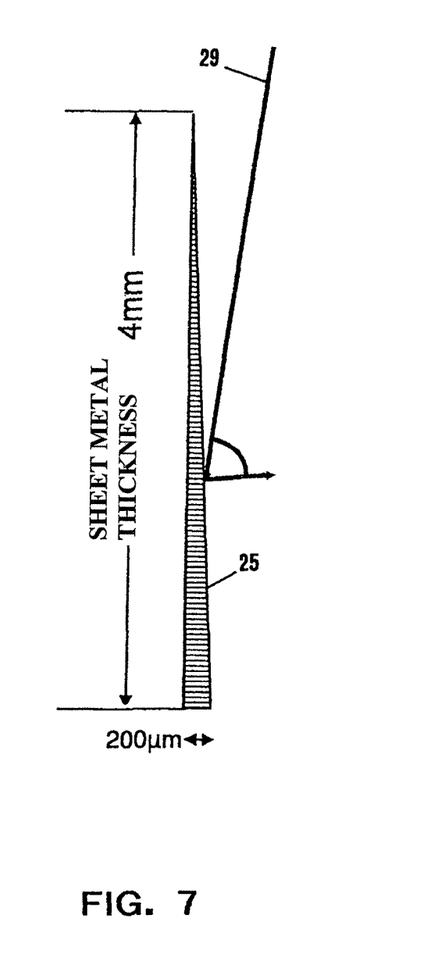
FIG. 7 shows a presentation corresponding to FIG. 6 with an incident angle of 78° for 1 μm laser radiation, however, with a beam divergence of 12°.

In contrast to FIG. 6, FIG. 7 shows a workpiece or material, respectively, with a sheet metal thickness of 4 mm, with a 1 µm laser radiation 29 striking the interface 25 at an incident angle of 78° with a beam divergence of 12°. The result is then a steep, narrow interface, and still the smaller incident angle of the main absorption maximum according to FIG. 5 is achieved. Through the divergent radiation components (due to the beam divergence of 12° in the example of FIG. 7) high degrees of absorption and a good, achievable machining quality can be reached even with the 1 µm laser radiation in spite of the narrow and steep interface with a stable process control.

There has thus been shown and described a novel method and apparatus for machining material using laser radiation which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for machining material using laser radiation, said method comprising the steps of:
   (a) focusing unfocused laser radiation through a focusing optics to create an optical beam comprising a smaller beam cross-section and forming a beam waist along an optical beam axis,
   (b) directing the optical beam axis of the focused laser radiation toward a material surface to create an interface of laser radiation and material,
   (c) holding the beam waist, which results from focusing the laser radiation, in the region of the interface of laser radiation and material to be machined,
   wherein the laser radiation is partially absorbed at the interface such that, due to induced material removal or displacement, the interface and thus also the laser radiation penetrates into the material, and
   wherein the spacing of the beam waist from one of the upper and lower side of the interface in the axial direction corresponds at most to triple the value of the penetration depth of the interface into the material,
   said method further comprising the step of focusing the optical beam such that components of the laser radiation are divergent not only, in the propagation direction, downstream of the beam waist but also within the beam waist itself and upstream of the beam waist, thus being directed away from the beam axis, these divergent laser radiation components and angles by which they diverge being greater than the effects of imaging errors that are produced with standard optics,
   wherein the divergent laser radiation components form reduced incident angles on the interface and thus increase the absorption of the radiation components on the interface and reduce the changes of the absorption at fluctuations in the incident angles.

2. A method as set forth in claim 1, wherein the divergent laser radiation components are generated laser-internal or laser-external using at least one beam-shaping optic.

3. A method as set forth in claim 1, wherein the divergent laser radiation components are generated by creating or increasing the aberration in the beam-shaping optic.

4. A method as set forth in claim 1, wherein at least one of positive and negative spherical aberrations or chromatic aberrations are created or their value is increased.

5. A method as set forth in claim 3, wherein an aberration in the optic is achieved by means of at least one of diffractive, refractive and diffuse optical elements.

6. A method as set forth in claim 5, wherein the optical elements comprise at least one of solid, liquid and gaseous materials and media with at least one of transmitting and reflecting properties.

7. A method as set forth in claim 3, wherein an aberration in the optic is achieved by using the combination of at least one concave and one convex optical interface.

8. A method as set forth in claim 3, wherein, with the optic that achieves an aberration, at least one of collimation and focusing of the laser radiation is carried out at the same time.

9. A method as set forth in claim 3, wherein an aberration in the optic is achieved by using at least one optical element with at least one aspherical surface.

10. A method as set forth in claim 9, wherein the optical element is an axicon or a Fresnel optic.

11. A method as set forth in claim 3, wherein an aberration in the optic is achieved through at least one optical element with at least one of a laterally and axially varying refractive index.

12. A method as set forth in claim 2, wherein the beam-shaping optic is designed as an adaptive optic and wherein at least one of the amount, the lateral and the axial distribution of the aberration is adjustable.

13. A method as set forth in claim 12, wherein the adjustments are controlled for adaptation to the processing parameters.

14. A method as set forth in claim 1, wherein the divergent laser radiation components are used to create defined spatial power density distributions in the region of the interface.

15. A method as set forth in claim 13, wherein the parameters are selected from the group consisting of a type of material, material thickness, machining speed, and laser power, before and during machining.

16. A method as set forth in claim 14, wherein the power density distributions are one of ring distributions and top-hat distributions.

* * * * *